United States Patent [19]
Mincher et al.

[11] Patent Number: 5,604,869
[45] Date of Patent: Feb. 18, 1997

[54] SYSTEM AND METHOD FOR SENDING AND RESPONDING TO INFORMATION REQUESTS IN A COMMUNICATIONS NETWORK

[75] Inventors: Richard W. Mincher, San Jose; Kerry E. Lynn, Redwood City, both of Calif.

[73] Assignee: Apple Computer, Inc., Cupertino, Calif.

[21] Appl. No.: 579,094

[22] Filed: Dec. 20, 1995

Related U.S. Application Data

[63] Continuation of Ser. No. 89,732, Jul. 9, 1993, abandoned.

[51] Int. Cl.$^6$ .............................. G06F 13/42; H04J 3/02; H04L 29/08
[52] U.S. Cl. ................. 395/200.2; 395/200; 370/445
[58] Field of Search .................... 364/919; 395/200.02, 395/200.06, 200.1, 200.11, 200.2; 370/85.2, 85.3, 95.3, 95.1, 95.2

[56] References Cited

U.S. PATENT DOCUMENTS

| | | | |
|---|---|---|---|
| 3,676,859 | 7/1972 | Hollaway et al. | 340/172.5 |
| 4,063,220 | 12/1977 | Metcalfe et al. | 370/85.3 |
| 4,665,519 | 5/1987 | Kirchner et al. | 370/94 |
| 4,876,742 | 10/1989 | Vacon et al. | 455/66 |
| 4,907,224 | 3/1990 | Scoles et al. | 370/85.2 |
| 5,040,175 | 8/1991 | Tuch et al. | 370/85.2 |
| 5,142,550 | 8/1992 | Tymes | 375/1 |
| 5,153,878 | 10/1992 | Krebs | 370/95.1 |
| 5,231,634 | 7/1993 | Giles et al. | 370/95.1 |
| 5,319,641 | 7/1994 | Fridrich et al. | 378/85.3 |
| 5,321,819 | 6/1994 | Szczepanek | 395/325 |
| 5,329,531 | 7/1994 | Diepstraten et al. | 370/94.2 |
| 5,339,316 | 8/1994 | Depstraten | 370/85.13 |
| 5,353,287 | 10/1994 | Kuddes et al. | 370/85.2 |
| 5,369,639 | 11/1994 | Kamerman et al. | 370/85.3 |
| 5,379,290 | 1/1995 | Kleijne | 370/85.2 |
| 5,436,903 | 7/1995 | Yang et al. | 370/85.3 |
| 5,446,735 | 8/1995 | Tobagi et al. | 370/85.3 |

FOREIGN PATENT DOCUMENTS 0405074  9/1990  WIPO .............................. G06F 13/42

OTHER PUBLICATIONS

"IBM PC", Goldstein et al, 1984, pp. 6–12 and 357.
"Optical–electrical interface for IR wireless Ethernet Local", Local computer networks, 1991 16th conference.
"Computer Networks", Tanenbaum, 1989, Chapter 3.
ANSI/IEEE Std 802.3, Fourth edition, 1993 (CSMA/CD) carrier sense multiple access with collison Detection.
Serizawa, A Radio Access Scheme For CSMA/CD LAN, 1989, 15.4.1–15.4.5.

(List continued on next page.)

*Primary Examiner*—Alyssa H. Bowler
*Assistant Examiner*—Mark H. Rinehart
*Attorney, Agent, or Firm*—Greg T. Sueoka

[57] ABSTRACT

A system for sending and responding to information requests in a wireless communications network includes a display device, a central processing unit, memory means including random access memory and read-only memory, an input device, and a transmitter/receiver. The random access memory further comprises routines for processing, sending and receiving messages over the wireless network.

The present invention also comprises a method for requesting information and a method for responding to requests for information. The preferred method for handling information requests comprises the steps of: monitoring the communications channel for availability; sending an information request over the channel; receiving the information request at each node within the network; preparing responses to the information request at each node; and sending the response to the information request over the channel if it is available. The method for responding to a request for information advantageously uses the minimum number of request to solicit the minimum number of replies to the information request.

26 Claims, 9 Drawing Sheets

OTHER PUBLICATIONS

Natarajan, Query Retrieval Protocols In A Broadcast Environment, 1985, 8.1.1–8.1.6.

Xialing, The Transmission Capacity Of Chinese Speech On 3COM Ethernet For Integrated Voice/Data Transmission, 1990, 785–87.

*IEEE Standards For Local And Metropolitan Area Networks*: IEEE Std 802.10–1992, Annex 2D, Rationale for placement, pp. 44–45.

Paul E. Green, Jr., "Computer Network Architectures and Protocols."

SYSTEM AND METHOD FOR SENDING AND RESPONDING TO INFORMATION REQUESTS IN A COMMUNICATIONS NETWORK

RELATED APPLICATIONS

This is a continuation of prior application Ser. No. 08/089,732 filed on Jul. 9, 1993, now abandoned.

BACKGROUND OF THE INVENTION

1. Field of the Invention

The present invention relates generally to communication systems for computer networks. In particular, the present invention relates to a system and method for sending and responding to information requests in a wireless communications network. Still more particularly, the present invention relates to a non-persistent method of transmitting and receiving data.

2. Description of the Related Art

During the recent past, the use of computer communication networks has become widespread. Included in the development of computer communication networks is the advent of the wireless communication network. Referring now to FIG. 1, a block diagram of a prior art wireless communications system 20 is shown. The wireless communications system 20 comprises a plurality of node computer systems 22 that are positioned within a predetermined distance of each other for sending and receiving messages via radio signals. A particular node, A, can receive signals from any one of the plurality of nodes 22 within a predetermined bounding zone or range as delineated by the circular area 24. Each of the other nodes 22 is also able to receive signals within a range, where each respective node is at the center of the range. The nodes 22 are effectively linked together for communication with each other using a particular channel or frequency for transmitting and receiving signals.

One problem with such wireless networks is that they have only very limited bandwidth. Unlike traditional wire networks, there is no dedicated line coupling the nodes to each other. Because of Federal regulations pertaining to certain frequency bands, the network can only operate a small predetermined amount of time (typically 400 ms) on any one channel, and the signals must be within a narrow frequency band thereby limiting the number of channels available. Thus, the bandwidth for wireless networks to transfer information is severely limited. This significantly impacts the amount of information that can be carried over the network.

Another problem is network flooding. Many network systems provide a class of general broadcast messages or information requests that are sent over the network, and to which any node on the system can respond. Such information requests are sent over the network, and one or more nodes will prepare response messages to provide the information requested. The response messages are then sent over the network back to the requesting node. However, the process of sending a request message often has the effect of flooding the network with multiple redundant response messages responding to the initial request. Unfortunately, these response messages can degrade performance of the network until all the response messages have been delivered to the requesting node. In distributed network systems where multiple nodes may respond, no solution to this network flooding problem has been found. Moreover, the problem of network flooding is even more severe on wireless networks because of their limited bandwidth.

The prior art has attempted to reduce the effects of network flooding using a variety of techniques. One such technique has been to designate a single node as a master node, and to have the master node respond to all messages in the general broadcast class. However, the problem with this method is that the node designated to be master undergoes serious performance degradation because of the added responsibility of having to respond to all the general information requests. The added responsibility creates further problems because it interferes with the normal operation of the master node. Moreover, the nodes in wireless networks are often mobile computers designed for portability. The nodes will continuously move in and out of the range of the wireless network, therefore, it is very difficult to choose a master node and be sure that the master node will always be connected to the network as required for master nodes.

A second technique used to reduce the effects of network flooding has been to designate a group or subset of nodes as masters in an attempt to distribute the costs and burden of responding to the information requests. However, this technique creates other problems. The major shortcoming of the second technique is the difficulty in selecting the appropriate subset of nodes. The appropriate subset of nodes depends on the number of nodes coupled to the network. Since the number of nodes in a wireless network can fluctuate greatly, it is difficult to select the appropriate number of nodes to designate as masters. If the network is small (has very few nodes) and the set of master nodes is large, many duplicate responses will be generated and the reduction of network flooding is minimal. On the other hand, if the network is large (has many nodes) and the set of master nodes is small, any request for information must be generated and sent many times before a response is received. This second technique also requires additional overhead for monitoring the number of master nodes and maintaining the number of master nodes at an appropriate level since a node that is designated a master node may lose contact with the network as it moves outside the range of the network.

Therefore, there is a need for a system and method that effectively eliminate the flooding problems exacerbated by the limited bandwidth of wireless networks. Moreover, there is a need for a system and method that can reduce the effects of flooding even in truly distributed systems on wired networks.

SUMMARY OF THE INVENTION

The present invention overcomes the limitations and shortcomings of the prior art with a system and method for sending and responding to information requests on a wireless communications network. The system of the present invention advantageously includes a plurality of node/computer systems positioned within a predetermined distance of each other. Each node system of the present invention preferably comprises: a display device, a central processing unit, memory means including random access memory and read-only memory, a hard copy device, an input device, a data storage device, and a transmitter/receiver. The random access memory further comprises an operating system, an application program, and routines for transmitting and receiving messages over the wireless network. The central processing unit, display device, input device, and memory are coupled and operate to execute the application program stored in the memory. The system also executes the routines for non-persistently transmitting and receiving messages over the wireless network. The routines are preferably executed concurrently with the normal operation of the node system. The routines advantageously operate in a manner that eliminates flooding in response to information requests, and optimizes information requests and replies such that use of bandwidth on the wireless network is minimized.

The present invention also comprises a method for sending an information request adapted for a wireless communications network and a method for responding to an information request on the wireless communications network. The preferred method for handling information requests comprises the steps of: monitoring the communications channel for availability; sending an information request over the channel; receiving the information request at each node within a predetermined distance of the requesting node; preparing a response to the information request at each receiving node; sending a response to the information request over the media if the media is available; and receiving the response message at the requesting node. The step of requesting information is preferably performed a predetermined number of times with the present invention until a response is received. The method for responding to an information request is particularly advantageous because the minimum number of replies will be sent over the network. Each node tries to send the response only once, and if the channel is busy, then the response is discarded and not sent.

DETAILED DESCRIPTION OF THE PREFERRED EMBODIMENT

Although the methods of the present invention will now be described with reference to a wireless communications network, and methods are most advantageous in that environment, those skilled in the art will realize that the methods of the present invention may also be used on traditional hard wired or fiber optic local area networks to reduce the effects of network flooding.

Figure 1:
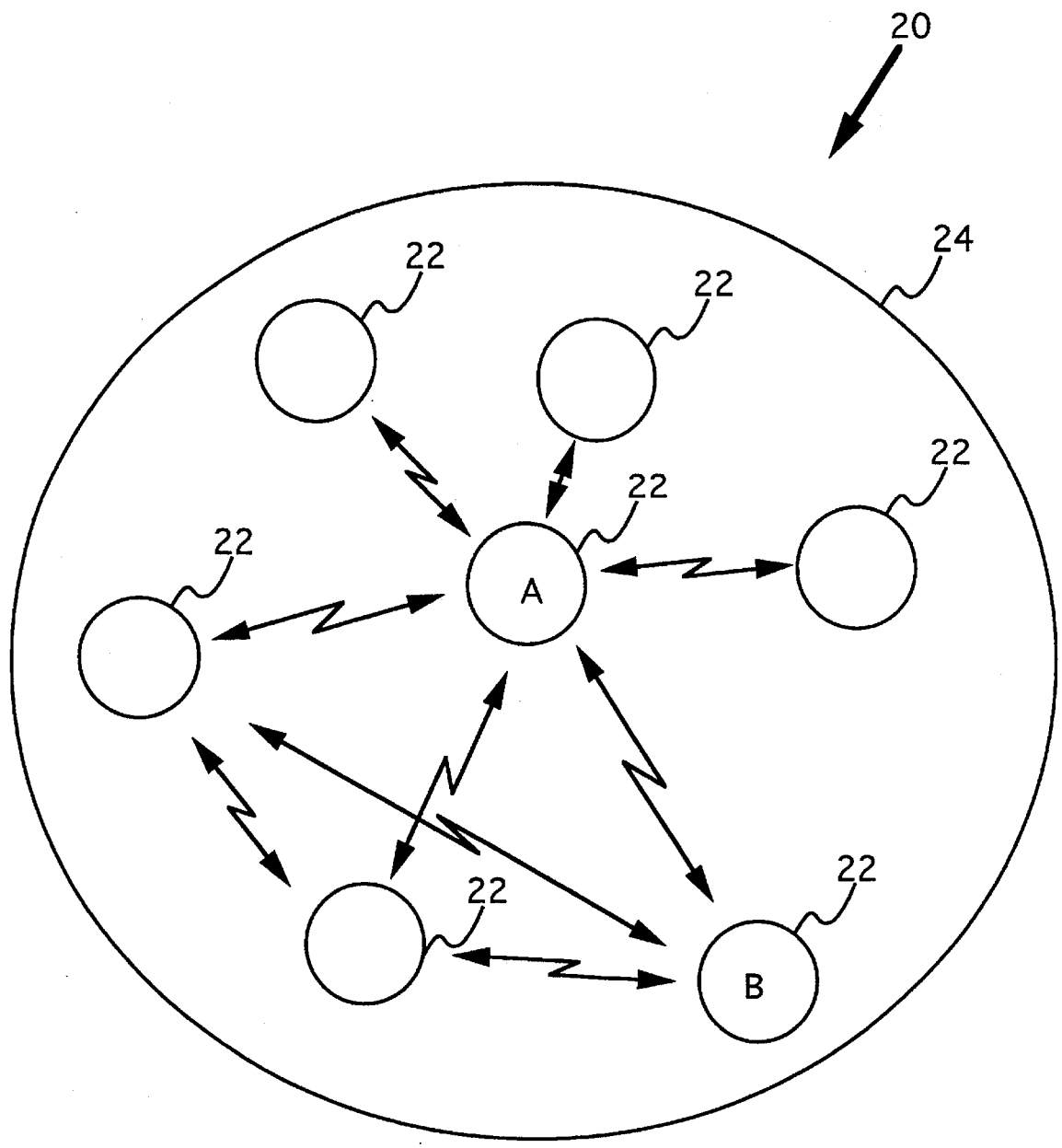
FIG. 1 is a block diagram of a prior art wireless communications network with a plurality of nodes upon which the present invention operates.
Figure 2:
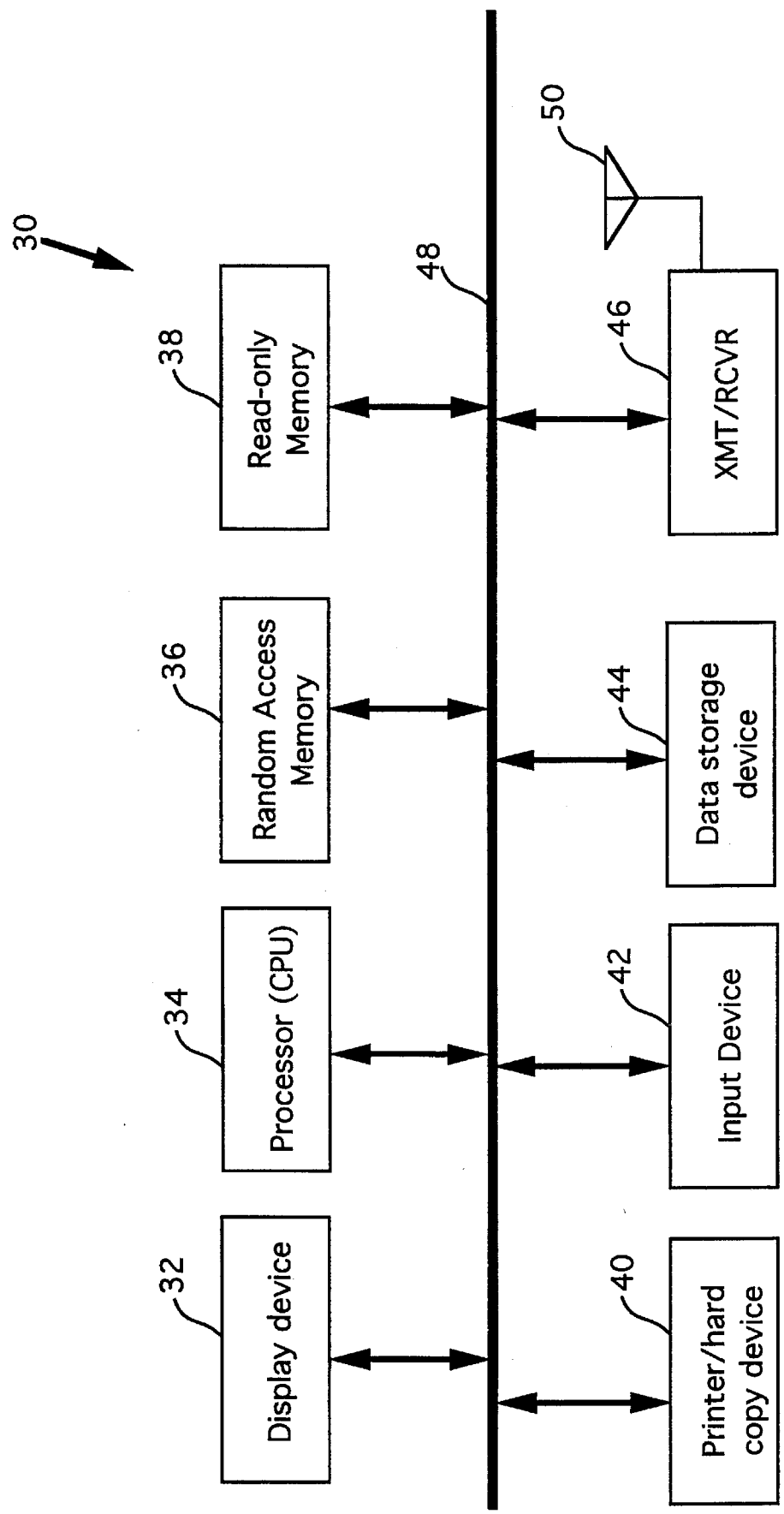
FIG. 2 is a block diagram of a preferred embodiment for the computer system at each node of the wireless communications network.

The wireless communications network of the present invention comprises a plurality of node systems 30. The wireless communications network is preferably a wireless frequency hopping spread spectrum network. Referring now to FIG. 2, a block diagram of a preferred embodiment of a node system 30 constructed in accordance with the present invention is shown. The node system 30 preferably comprises a display device 32, a central processing unit (CPU) 34, memory means including random access memory 36 and read-only memory 38, a hard copy device 40, an input device 42, a data storage device 44, and a transmitter/receiver 46. The CPU 34 is connected by a bus 48 to the display device 32, an input device 42, and memory 36, 38. The CPU 34, display device 32, input device 42, and memory 36, 38 may be coupled in a conventional manner such as a personal computer. The CPU 34 is preferably a microprocessor such as an Motorola 68040 or Intel 486; the display device 32 is preferably a video monitor; and the input device 42 is preferably a keyboard and mouse type controller. The CPU 34 is also coupled to the hard copy device 40 such as a laser printer, and the data storage device 44 such as a hard disk drive in a conventional manner.

The bus 48 is also coupled to the transmitter/receiver 46 to facilitate communication with the other nodes 30 of the wireless network. The nodes 30 communicate with each other by transmitting and receiving signals at predetermined frequencies over a media. For purposes of the present invention, the media is a preset number of channels within a frequency band. In the preferred embodiment, the nodes 30 use radio signals to communicate although infrared or other signals could be used. Only one of the nodes 30 may transmit on the media or designated frequency at any particular instance. The transmitter/receiver 46 preferably includes a transmitter for sending radio signals representing data over the media to other nodes 30 positioned within the range of transmitter/receiver 46. The transmitter/receiver 46 also includes a receiver for receiving radio signals sent from other nodes 30. In addition to sending, receiving and storing the signals sent over the media, the transmitter/receiver 46 is able to sense the media and determine whether another node 30 is transmitting on the media. The transmitter/receiver 46 is coupled to the bus 48 to provide a signal to the CPU 34 indicating whether the media is busy (i.e., a node is currently transmitting on the media). The transmitter/receiver 46 is also coupled to an antenna 50 for sending and receiving the radio signals. The transmitter/receiver 46 performs conventional processing to translate radio signals into digital signals usable by the node system 30 and translate data from the CPU 34 into radio signals.

The CPU 34, under the guidance of instructions received from the memory 36, 38 and from the user through the input device 42, provides signals for sending and receiving data using the transmitter/receiver 46. The transfer of data over the network is broken down into the sending and receiving of messages or packets between various nodes 30 coupled to the network. The methods of the present invention preferably optimize the requesting and responding processes necessary for maintaining communication over the wireless network. The preferred protocol of the network provides a specialized subclass of general broadcast messages, referred to here as information requests, that are transmitted over the network to all nodes 30, but require that only a single response be received. This specialized class of messages are messages to which all nodes 30 would provide the same or a similar answer. The response can be from any node that received the information request. For example, one such information request is a "join request." In order to join a particular wireless frequency hopping spread spectrum network, a node/system 30 would transmit a join request. The join request is a message asking any one of the existing nodes 30 of the network to send a response message containing the information necessary to gain access to the network. Many nodes 30 in the wireless frequency hopping spread spectrum network may try to respond to the join request, however, only a single response to the message is necessary to provide the node 30 that issued the join request with the information needed to locate the network, and synchronize its hopping rate and phase with the desired frequency hopping spread spectrum network. Other examples of such information requests include, but are not limited to, inquire requests and synchronization requests.

The routines of the present invention for optimizing the handling of such messages as well as an operating system and application programs are preferably stored in memory 36, 38. The routines for optimizing that are stored in memory 36, 38 include a routine for sending an information request over the network, and a routine for responding to a received information request. The present invention preferably uses a conventional operating system 28 such as Macintosh System Software version 7.1, DOS or Windows. The memory 36, 38 may also include a variety of different application programs including but not limited to computer drawing programs, word processing programs, and spreadsheet programs.

Figure 3:
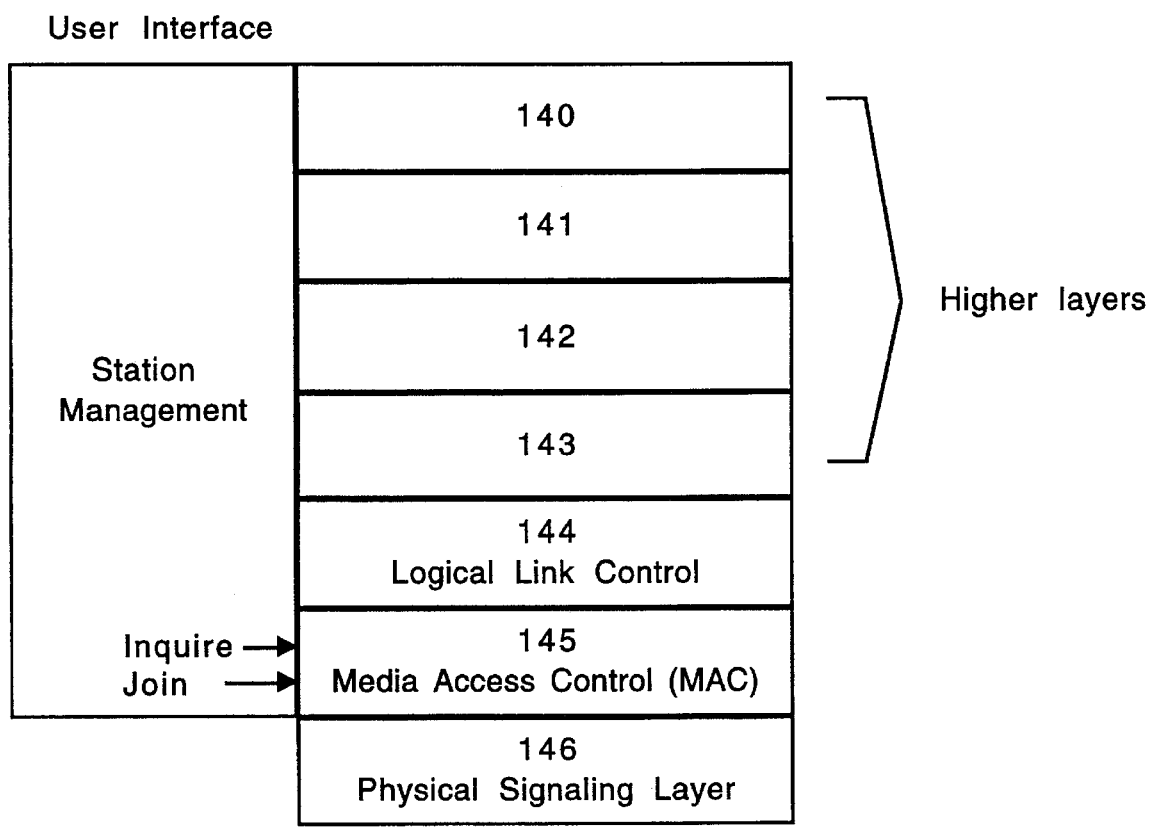
FIG. 3 is a block diagram of the preferred embodiment for the network protocol layer hierarchy used for the present invention.

As shown in FIG. 3, the CPU 34 also utilizes a protocol layer hierarchy (corresponding, for example, to the ISO-OSI reference model) to communicate over the network. The hierarchy of the present invention preferably includes a plurality of higher level layers 140–143 for processing messages, a logical link control (LLC) layer 144, a medium access control (MAC) layer 145, and a physical signaling layer 146. These layers operate in conjunction with a station management layer 147 to process all messages sent and received over the network. For example, inquire and join requests from the station management layer 147 are processed by the MAC layer 145. The MAC layer 145 controls access to the physical signaling layer 146 that provides the actual hardware for transmitting and receiving messages. In the preferred embodiment of the present invention, the LCC layer 144 interface provides two request types for controlling the flow of data to and from the MAC layer 145. The first request type is a receive_packet for receiving information that has been received by the physical layer 146. The second request type is a send_packet for identifying data to be transferred to the MAC layer 145, the physical layer 146 and over the network. In the present invention, the send_ packet request type preferably includes an input parameter field for the higher level layers 140–143 to indicate whether the packet should be sent on a persistent or non-persistent basis. The data in the field is then used by the MAC layer 145 and the physical layer 146 to determine the appropriate method to use in sending the packet. One example of a non-persistent send packet is a time service response. Typically, a requesting node will sent a time service request, asking any of the other nodes to indicate by a response message what the time is. Each receiving node will process the time service request by creating a response message and attempting to send the message over the network. Since many nodes may be responding to the request with the same information, the response message may be designated as non-persistent when it is passed from the LLC layer 144 to the MAC layer 145. The system will then try to send the message, and if the media is busy, the message will be discarded without being sent. An example of a persistent message is a name lookup request. For a name lookup request, a requesting node will send the lookup request, asking each of the other nodes to identify its unique name to unique network address binding. Since each node receiving the request must have a unique response to the request, the response message to the lookup request sent by each node must be sent persistently. In other words, once the message is passed to the MAC layer 145, the message cannot be discarded if the media is busy, but must be sent over the network even if the lower layers 145, 146 must wait until the media is available. In the preferred embodiment, all send_ packet requests are assumed to be persistent unless the input parameter in the request specifies a non-persistent send.

The present invention advantageously provides specific routines for optimizing the handling of information requests to eliminate the problems of the prior art. The present invention provides a method of responding to information requests that is specifically designed to eliminate flooding of the network with response messages. In particular, the method of responding to information requests advantageously uses a non-persistent transmission method in which a node decides not to send the response message if the media is busy. The response method of the present invention operates on the assumption that if the media is busy, then the response message may be discarded because another node is already responding to the information request by sending a response message, and thus, causing the media to be busy. However, since this assumption is not always accurate, the present invention has also modified the method for sending a information request to account for the instances when the assumption is not valid. For example, the network may be busy with normal data traffic between nodes, and all the nodes would interpret this use of the media as responding to the information request when in fact a response was never sent. Use of this assumption is particularly advantageous because the present invention provides the optimum use of the network bandwidth since at most only one response to each information request will be sent over the network independent of the number of nodes on the network. The present invention also takes advantage of the fact that the cost to re-send the information request several times is small in comparison with cost of having to processes potentially hundreds or thousands of response messages that would be sent by each node coupled to the network. The present invention also eliminates all the network overhead associated with electing and maintaining a master node for the network.

Figure 4:
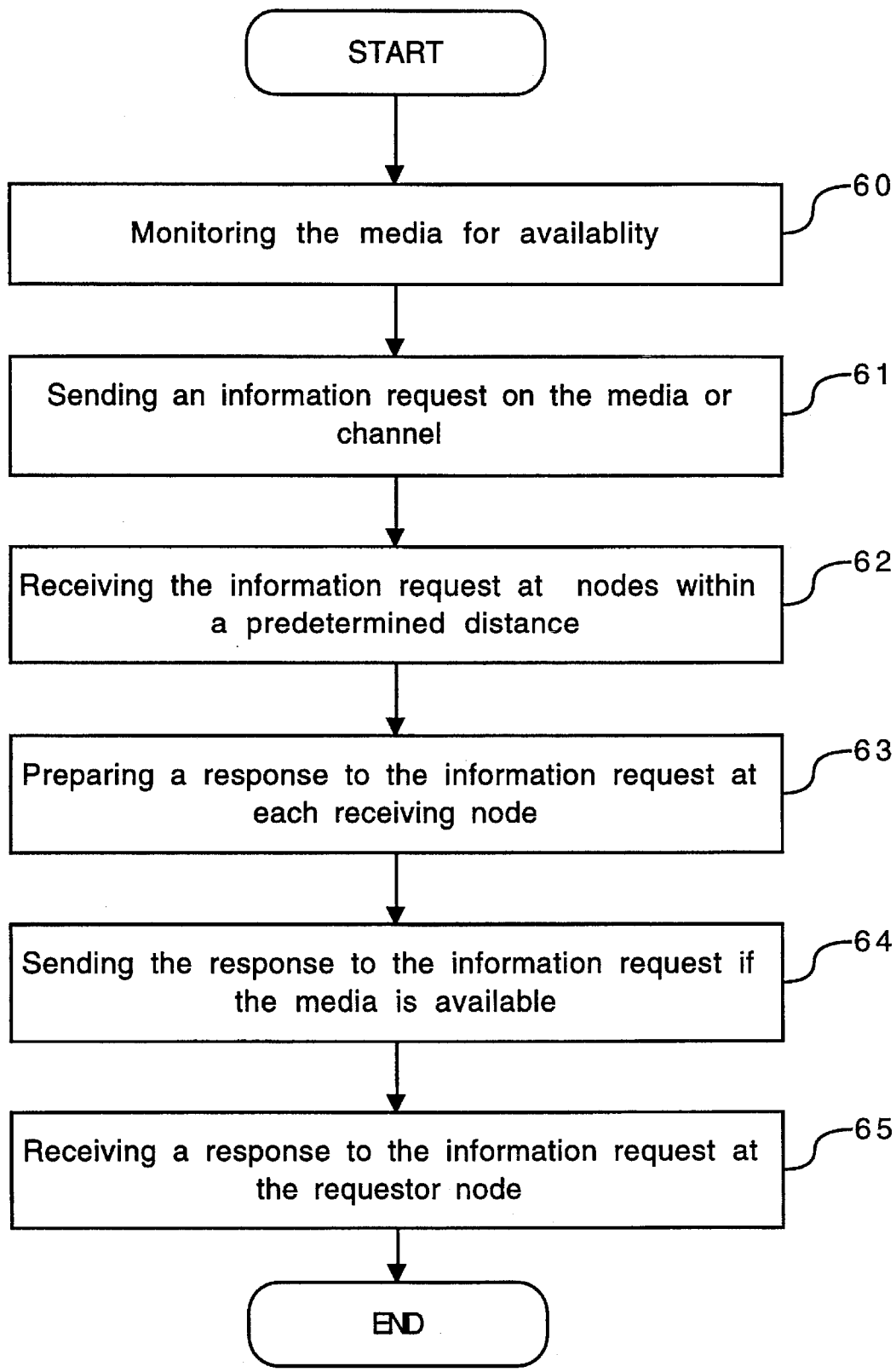
FIG. 4 is a flow chart of the preferred method of sending and responding to information requests on a wireless communications network.

Referring now to FIG. 4 an overview of the preferred process for requesting and responding to an information request is shown. The method begins in step 60 by monitoring the availability of the media used by the wireless network for communication. Before any node can transmit on the media, the media must be free for use. In other words, no two nodes are allowed to transmit over the wireless network at the same time. Next, in step 61, the node that wants to send an information request begins sending the message over the media on a designated channel. In step 62, the message is received at all of the other nodes within the range of the node sending the request. In step 63, each of the receiving nodes independently processes the information request message. The time required for each node to process the information request message will vary depending on the speed and processing capability of each node. The first node to process the information request message, prepare a response, and gain access to the media will send its response over the network in step 64. The other nodes including the node that requested the information will also receive the first response message sent. The other nodes will also prepare a response message and attempt to transmit the response message. However, upon determining that the media is in use, all but the first node to respond will simply discard their response messages and continue on with other operations. The response sent is then received by the requesting node in step 65. This method of the present invention is particularly advantageous because it insures that only a single response message will be sent over the network in response to the information request message. Therefore, the use of the limited bandwidth available with wireless networks is maximized and the problems of flooding are eliminated.

Figure 5:
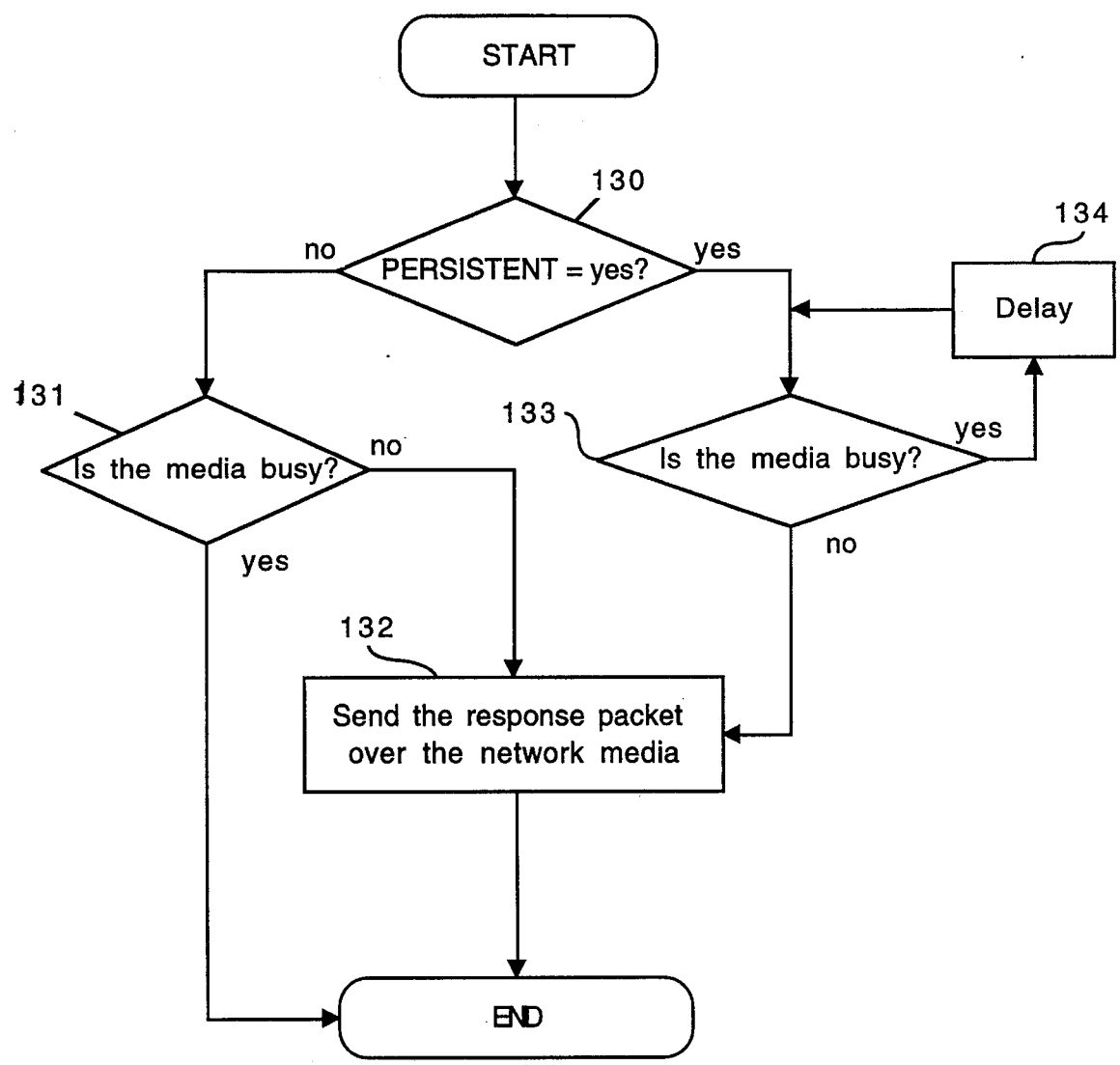
FIG. 5 is a flowchart of the preferred method for non-persistently sending an information request or sending a response to an information request according to the present invention.

Referring now to FIG. 5, the non-persistent method of sending messages whether they be information requests or responses is shown. The method begins in step 130 by determining whether the message is to be sent persistently or non-persistently. This can be determined from the type of information request if the protocol of FIG. 3 is used. Alternatively, the higher level layers 140–143 can identify whether the message should be sent persistently or non-persistently based on the type of request to which the response message corresponds. If it is determined in step 130 that the message is to be sent non-persistently, the method continues in step 131 and determines whether the media is busy. If the media is busy, then the process is complete. If the media is not busy, the method continues in step 132 where the response packet is sent over the network and then ends. However, if it is determined in step 130 that the message is to be sent persistently, then the method proceeds to step 133. In step 133, the method determines whether the media is busy. If the media is busy, then the method continues in step 134 by delaying, and then returning to step 133 to check the availability of the media. Since the message is being sent persistently, the method will continue to loop through steps 133 and 134 until the media becomes available. If the media is not busy, the method continues in step 132 by sending the response packet over the network. While the methods for sending an information request by the requesting node are described below as being persistent, those skilled in the art will realize that the non-persistent method of FIG. 5 may also be applied to the method for sending an information request to make it non-persistent.

Several methods for persistently and non-persistently sending information request messages as well as methods for persistently and non-persistently responding to information request messages are described below. Some of these methods incorporate the non-persistent sending method of FIG. 5. These methods can be used in a variety of combinations, however, the preferred embodiment of the present invention utilizes the persistent request method of FIG. 6 and the non-persistent response method of FIG. 8 for the specialized subclass of general broadcast messages.

Figure 6:
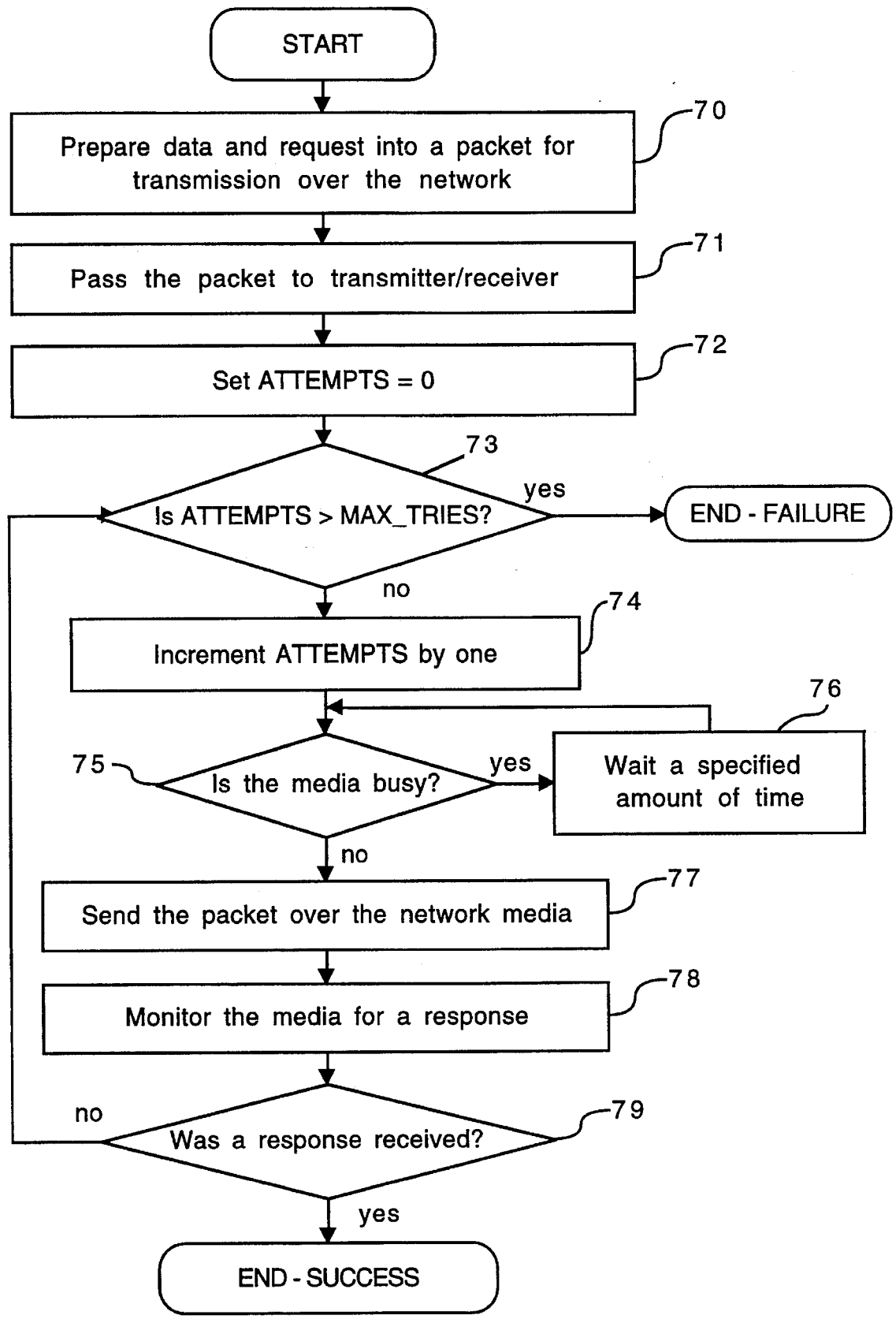
FIG. 6 is a flow chart of a first and preferred method for persistently sending an information request on a wireless communications network.

Referring now to FIG. 6, a first and preferred method for persistently sending an information request message on a wireless communications network is shown. The method begins in step 70 by preparing the contents of the information request into a packet for transmission over the network. This is preferably done by the CPU 34 using routines stored in memory 36, 38 that specify the formats and codes that the network protocol has established for information requests. Then in step 71, the packet is sent to the transmitter/receiver 46 for transmission over the wireless network. In step 72, a variable, ATTEMPTS, that monitors the number of times a request has been transmitted over the network is initialized by setting ATTEMPTS to zero. Then in step 73, the value of ATTEMPTS is compared to a variable MAX_TRIES. MAX_TRIES is a variable that indicates the maximum number of times a request will be transmitted over the network before the method ends in failure. In an exemplary embodiment the MAX_TRIES is set to a value of 10, thereby forcing the system 30 to repeat its request for information a limited, predetermined amount of times. If it is determined in step 73 that the number of times the request has been transmitted is greater than the maximum number requests attempts (ATTEMPTS>MAX_TRIES), then the method ends by failing to obtain a response to the request. On the other hand, if number of times the request has been transmitted has not exceeded MAX_TRIES, then the method continues in step 74. In step 74, the value stored in the ATTEMPTS variable is incremented by one. Next in step 75, the method tests whether the media used by the wireless network is in use. If the media is busy, the method continues in step 76 and waits a specified amount of time. In an exemplary embodiment, the method waits a specified amount of time as determined using a conventional back off algorithm as known to those skilled in the art. The back off algorithm preferably sets the delay as a function of the number of times the media has been found to be busy. For example, the back off algorithm can include an exponential component that varies the amount of time to wait depending on the number of times the media has been checked and found busy. Furthermore, the back off algorithm also randomizes the wait time to reduce the potential for collisions between nodes trying to gain access to the media simultaneously. Then the method returns to step 75 to again test if the media is available. Once the media is available, the method sends the packet over the network in step 77. The method proceeds to step 78, where the system waits and then monitors the network for a response. The method waits since none of the nodes will be able to respond immediately. There will be some amount of propagation delay for the message to be transmitted over the network and processed by the other nodes. In the preferred embodiment, the amount of time the requesting system waits in step 78 is an order of magnitude greater than the time required to transmit a maximum sized packet. In an exemplary embodiment the delay time is two times the time require to transmit the maximum sized packet, for example, 40 ms. Finally in step 79, the messages, if any were transmitted over the network during the delay, are processed and the method determines whether a response to the information request has been received. If a response has not been received, the method returns to step 73, to re-send the information request unless it is determined that the request has already been sent more than the maximum amount of times. If a response has been received, the method is complete and ends with success. While it is possible that the method of the present invention will require more than one information requests to obtain a response, the number of responses generated by each request will almost always be less than or equal to one. Therefore, the total amount of network time utilized by the information request and response processes is significantly less than any methods known in the prior art.

Figure 7:
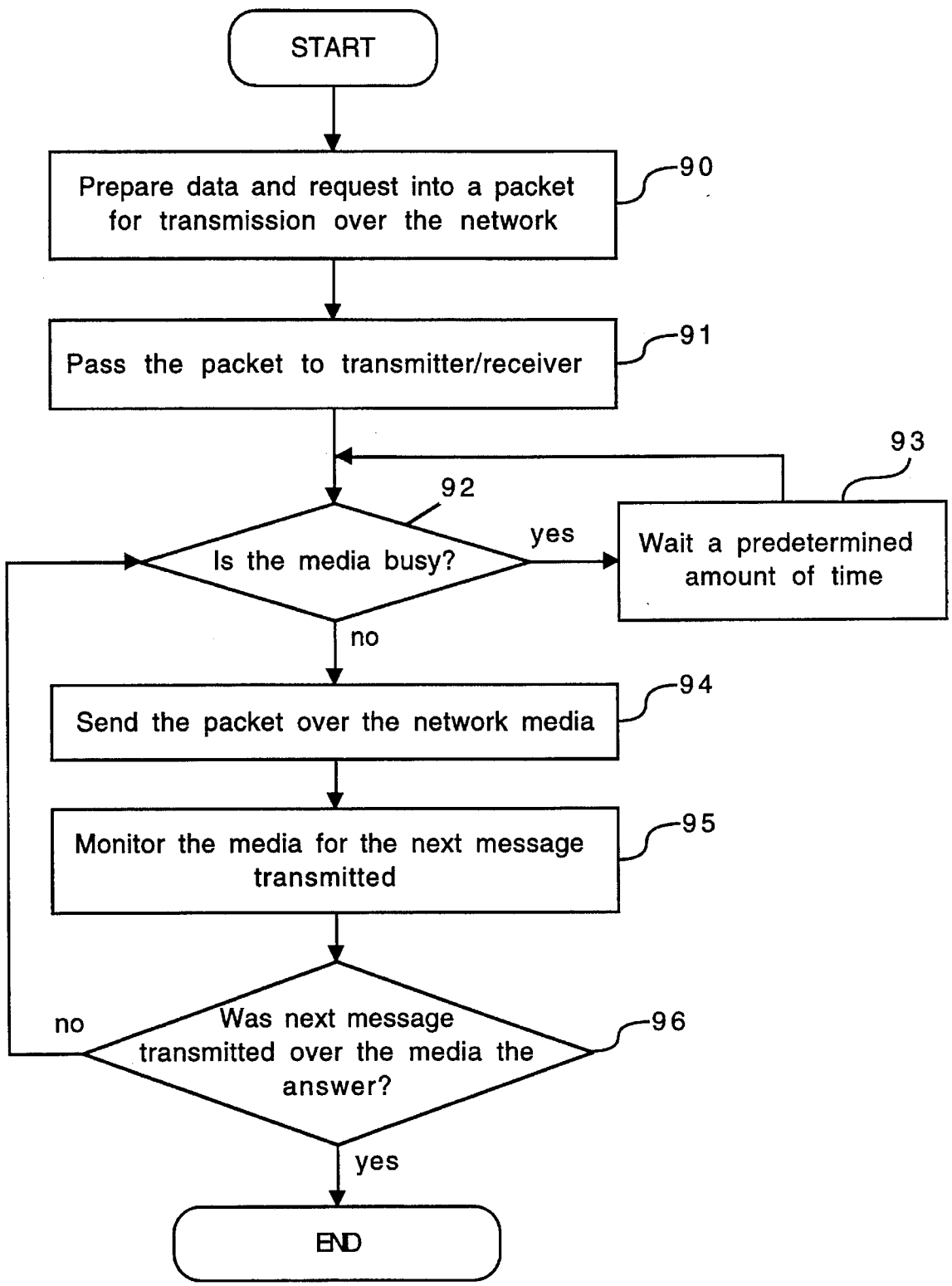
FIG. 7 is a flow chart of a second and alternate method for persistently sending an information request on a wireless communications network.

Referring now to FIG. 7, a second and alternate method for persistently sending an information request message is shown. The method begins similar to the preferred embodiment by preparing the contents of the information request into a packet for transmission over the network in step 90, and passing the packet to the transmitter/receiver 46 for transmission over the wireless network in step 91. Next in step 92, the method determines whether the media used by the wireless network is in use. If the media is busy, the method continues in step 93 and waits a predetermined amount of time. Then the method returns to step 92 to again determine if the media is available. Once the media is available, the method sends the packet of data over the network in step 94. The method then proceeds to step 95, where the system 30 monitors the network for any activity. In the alternate embodiment, the system 30 does not wait, and instead simply monitors the network for the next message transmitted over the network after the transmission of the information request is complete. Then in step 96, the method determines whether the next message transmitted over the network is a response or answer to the information request. Since the response method (described below) utilized by all the nodes 30 is non-persistent, the next message will either be a response to the information request or no response will be forthcoming over the network. For example, if the information request is sent out and the media is not busy, then the first node to prepare a response and gain access to the network will send its response, thus, the next message sent over the network will be a response to information request. On the other hand, if a message other than a response is being sent over the network after the information request completes transmission, the media will be busy. During the period when each nodes receives the information request, prepares a response and then checks media; the media will be busy sending the non-response message. However, each node will assume another node is responding to the information request, and each node will discard its respective response message and discontinue the process of sending the response to return to other operations. Thus, a response to the request will never be sent if the media is busy transmitting another non-response message. If the next message is found not to be a response or answer to the information request in step 96, the method returns to step 92 to repeat the process of sending the information request over the network. However, if the message is determined to be a response or answer in step 96, the process is complete. This alternate method is particularly advantageous because the delay for re-sending the request is minimized. The alternate method also has the advantage of continuing to send information requests until a response has been received, and will not end by returning a failure.

Figure 8:
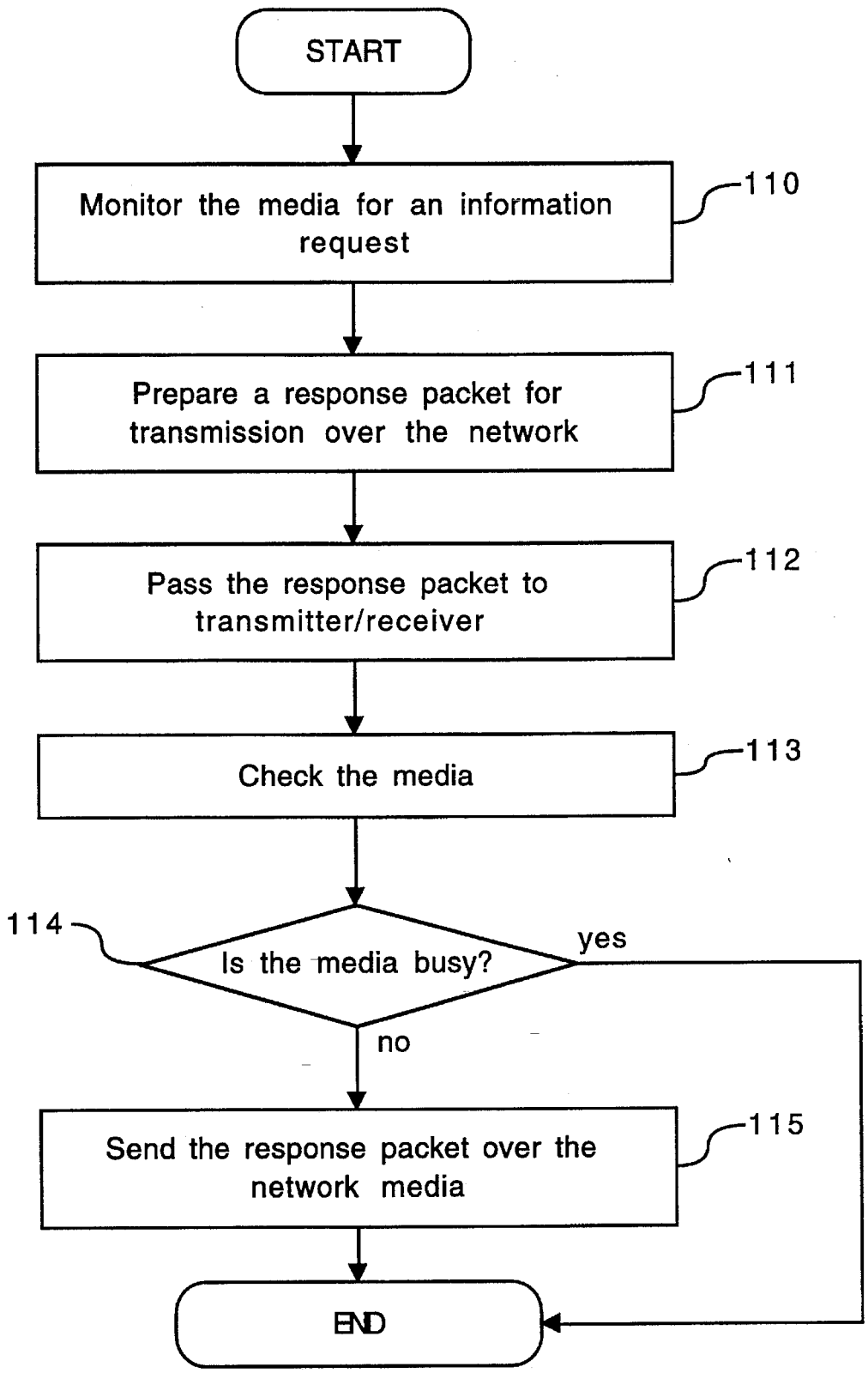
FIG. 8 is a flow chart of a first and preferred method for non-persistently responding to an information request on a wireless communications network.

Referring now to FIG. 8, the preferred method for non-persistently responding to an information request message is shown. The process begins in step 110 where the node system 30 using the present invention monitors the media for an information request. Once an information request has been received, it is processed by the CPU 34 under control of the instructions stored in memory 36. The CPU 34 processes the information request and prepares a response message packet in step 111. The response message is then preferably transferred to the transmitter/receiver 46 for transmission over the network in step 112. Then in step 113, the CPU 34 checks whether the media is busy. The transmitter/receiver 46 provides a signal indicating whether another node 30 is transmitting over the network and this signal can be read by the CPU 34 by polling the transmitter/receiver 46. In step 114, the method determines whether the media is busy. If the media is determined not to be busy, the response packet is transmitted over the network by the transmitter/receiver 46. On the other hand, if the media is found to be busy, then the message is discarded by the CPU 36 and the transmitter/receiver 46 does not bother sending the message. The protocol assumes that if the media is busy, then another node is in the process of responding to the information request and that is why the media is busy. As can be seen, this method is particularly advantageous because of its efficiency and simplicity. The method is very easy to implement and build into existing wireless network systems. An example of pseudo code for the method is shown in Appendix A. The method of the present invention is also very efficient. By using non-persistent transmissions, no estimates of network size are necessary. The method simply returns the fewest number of responses using the fewest number of requests.

Figure 9:
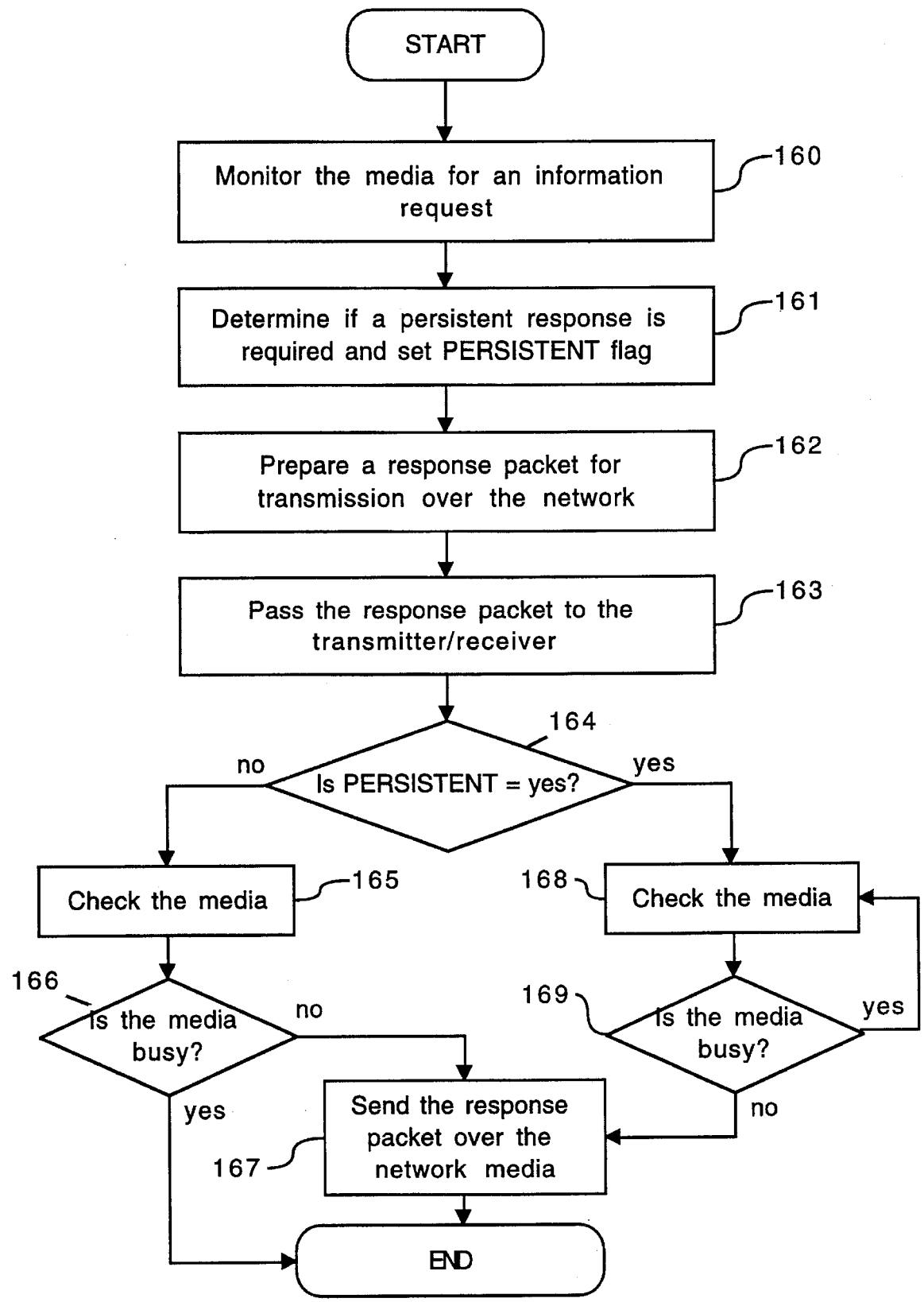
FIG. 9 is a flow chart of a second and alternate method for non-persistently responding to an information request on a wireless communications network.

A second and alternate method for non-persistently responding to an information request on a wireless communications network is shown in FIG. 9. The method begins in step 160 by monitoring the media for an information request. Next, in step 161, the method determines if a non-persistent response to the information request message is required, and sets the PERSISTENT flag accordingly. This step may be accomplished in a number of ways. For example, if the structure as described above with reference to FIG. 3 is utilized by the requesting node, the determination of whether a persistent or non-persistent response is required can be made by a relatively simple comparison of the information (i.e., a parameter) sent with the request. Alternatively, the method may require incorporation of additional intelligence in the higher level layers of the receiving node. Such intelligence would extract the identification number (ID) of the request, compare the ID to a list of requests for which a non-persistent response is permissible, and then set the PERSISTENT flag accordingly. Next, the CPU 34 prepares a response message packet in step 162, and the response message is transferred to the transmitter/receiver 46 for transmission over the network in step 163. Then in step 164, the method tests whether the response message is to be sent persistently or non-persistently by examining the PERSISTENT flag. If the message is to be sent non-persistently, the method continues in step 165 by checking the media. In step 166, the method determines whether the media is busy. If the media is busy, then the process is complete and ends. If the media is not busy, the method continues in step 167 by sending the response packet over the network. On the other hand, if it is determined in step 164 that the message is to be sent persistently, then the method proceeds to step 168 to check the media. In step 169, the method determines whether the media is busy. If the media is busy then the method returns to step 168 to check the availability of the media. Since the message is being sent persistently, the method will continue to loop through steps 168 and 169 until the media is available. Once the media is available, the response packet is sent over the network in step 167 to complete the method.

While the present invention has been described with reference to certain preferred embodiments, those skilled in the art will recognize that various modifications may be provided. For example, there may be additional methods for requesting information from the network or the process may be controlled by the higher level program routines stored in memory. These and other variations upon and modifications to the preferred embodiment are provided for by the present invention which is limited only by the following claims.

APPENDIX A

SAMPLE CODE.
```
//   This code sends a request over the media. If it receives a response, it returns
//   true. If no response is received, it will retry MAX_TRIES times before giving up.
Boolean
requester( )
{
     for(i=0; i < MAX_TRIES; i++)
     {
          while(MediaBusy( ))                //Wait for media to be idle
              ;                              //before sending
          SendBroadcastRequest( );           //Send request
          gotit = WaitForReply(TIMEOUT);     //Wait for reply
          if(gotit == TRUE)                  //if reply received, exit success
              return true;
     }
     return false;
}
//   This code attempts to reply to a received request. If the media is
//   busy, it is assumed that someone else is replying to the same
//   request. This is likely to be true. If we are wrong, the requester
//   will try several times. One of those times, it is quite likely that someone
//   will be able to respond.
void
replyToRequest( )
{
     if (MediaBusy( ))               //If media busy, don't respond
         return;
     SendResponse( );                //Send response
}
```

What is claimed is:

1. A node system for sending and receiving messages in a wireless network, the node system comprising:

a display device for displaying information to the user, the display device having an input;

an input device for inputting information to the system, the input device having an output;

a memory for storing data and routines, the memory having inputs and outputs, the memory including a means for responding to an information request message with a response message; said means for responding sensing whether the wireless network is in use and discarding the response message without transmitting the message over the wireless network and without further attempting to transmit the message, if the wireless network is in use:

a transmitter/receiver for receiving and translating radio signals into digital signals and for translating and transmitting digital signals into radio signals in response to digital control signals, the transmitter/receiver coupled to an antenna to receive and transmit radio signals, the transmitter/receiver having an input and an output for processing digital signals; and a processing unit for receiving signals from the input device, the memory and the transmitter/receiver; for sending signals to the display device, the memory and the transmitter/receiver; the processing unit having inputs and outputs; the inputs of the processing unit coupled to the output of the input device, the outputs of memory and the output of the transmitter/receiver; the outputs of the processing unit coupled to the inputs of memory, the input of the display device, the inputs of the transmitter/receiver, and the input of the transmitter/receiver; the processing unit controlling and processing the message sent and received from the wireless network via the transmitter/receiver.

2. The system of claim 1, wherein the transmitter/receiver further comprises:

a receiver for receiving radio signals and converting them to digital signals, the receiver having an input and an output, the input of the receiver is coupled to the antenna, and the output providing a digital signal;

a transmitter for receiving digital signals and converting them to radio signals, the transmitter having an input and an output, the output of the transmitter is coupled to the antenna; and a buffer for storing data, the buffer coupled to the receiver and the transmitter for storing digital signals from each, the buffer having inputs and outputs, an output of the buffer coupled to the input of the transmitter, and an input of the buffer coupled to the output of the receiver, the inputs and outputs of the buffer also coupled to the processing unit.

3. A computer implemented method for sending an information request message and responding to the information request message on a communications network for a plurality of node computer systems, the node computer systems being coupled by a media, the method comprising the steps of:

sending an information request message from a first node computer system coupled to the network;

receiving the information request message at a second node computer system coupled to the network;

preparing a response message to the information request message with the second node computer system;

determining whether the media is in use with the second node computer system;

sending the response message over the network with the second node computer system if the media is not in use; and discarding the response message from the second node computer system without sending the response message and without further attempting to send the response message, if the media is in use.

4. The method of claim 3, further comprising the step of monitoring the availability of the media used by the communications network using the first node computer system before the step of sending the information request message.

5. The method of claim 3, further comprising the steps of:

receiving the information request message at a third node computer system coupled to the network;

preparing a response message to the information request message with the third node computer system;

determining whether the media is in use with the third node computer system;

sending the response message over the network with the third node computer system if the media is not in use; and discarding the response message from the third node computer system without sending the response message and without further attempting to send the response message, if the media is in use.

6. The method of claim 3, further comprising the steps of:

receiving the information request message at the other node computer systems coupled to the network;

preparing a response message to the information request message at each of the other node computer systems;

determining whether the media is in use with each of the other node computer systems;

sending the response message over the network by each other node computer systems that determines the media is not in use; and discarding the response message from the node computer systems without sending the response message and without further attempting to send the response message, for each other node computer system that determines the media is in use.

7. The method of claim 3, wherein the step of sending an information request message from a first node computer system further comprises the steps of:

preparing the data and information request into a packet;

transferring the packet from a CPU to a transmitter/receiver of the first node computer system; and sending the packet over the media using the transmitter/receiver of the first node computer system.

8. The method of claim 7, wherein the step of sending an information request message from a first node computer system further comprises the steps of:

setting a maximum number of times to repeat the sending step;

determining whether the media is in use with the first node computer system;

delaying a predetermined amount of time if the media is in use, and then returning to the determining step;

sending the packet over the media using the transmitter/receiver of the first node computer system if the media is not in use; and repeating the steps of determining, delaying and sending until the information request message has been sent the maximum number of times.

9. The method of claim 7, wherein the step of sending an information request message from a first node computer system further comprises the steps of:

first determining whether the media is in use with the first node computer system;

delaying a predetermined amount of time if the media is in use, and then returning to the determining step;

sending the packet over the media using the transmitter/receiver of the first node computer system if the media is not in use;

monitoring the media for a next message transmitted over the network;

determining whether the next message transmitted over the network is a response to the information request message transmitted by the first computer node system; and returning to the first determining step if the next message transmitted over the network is not a response to the information request message.

10. A computer implemented method for sending an information request message on a wireless communications network for a plurality of node computer systems, the node computer systems being coupled by a media, the method comprising the steps of:

determining at a first node whether messages sent in response to the information request message are to be sent persistently or non-persistently, the determination based on information at the first node;

preparing a packet including data indicating whether messages sent in response to the information request message are to be sent persistently or non-persistently and including the information request message;

transferring the packet from a CPU to a transmitter/receiver of the first node computer system; and sending the packet over the media using the transmitter/receiver of the first node computer system.

11. The method of claim 10, further comprising the steps of:

setting a maximum number of times to repeat the sending step; and repeating the step of sending until the information request message has been sent the maximum number of times.

12. The method of claim 10, further comprising the steps of:

setting a maximum number of times to repeat the sending step;

determining whether the media is in use with the first node computer system;

delaying a predetermined amount of time if the media is in use, and then returning to the determining step;

sending the packet over the media using the transmitter/receiver of the first node computer system if the media is not in use; and repeating the steps of determining, delaying and sending until the information request message has been sent the maximum number of times.

13. The method of claim 12, wherein the step of sending an information request message from a first node computer system further comprises the steps of:

monitoring the media for a response message using the first node computer system;

determining whether a response was sent on the media and received by the first node computer system; and wherein the step of repeating is only performed if a response was not received.

14. The method of claim 13, wherein the step of monitoring the media for a response message also includes the step of waiting a predetermined amount of time before the step of determining whether a response was sent.

15. The method of claim 14, wherein the predetermined amount of time for the waiting step is two times greater than the time required to transmit a maximum sized message over the wireless communications network.

16. The method of claim 10, further comprising the steps of:

monitoring the media for the next message transmitted over the network;

determining whether the next message transmitted over the network is a response to the information request message transmitted by the first computer node system; and returning to the sending step if the next message transmitted over the network is not a response to the information request message.

17. The method of claim 16, further comprising the steps of:

determining whether the media is in use with the first node computer system;

delaying a predetermined amount of time if the media is in use, and then returning to the step of determining whether the media is in use; and wherein the step of returning continues with the step of determining whether the media is in use instead of the sending step.

18. A computer implemented method for responding to an information request message on a communications network for a plurality of node computer systems, the node computer systems being coupled by a media, the method comprising the steps of:

monitoring the media for an information request message at a node computer system coupled to the network;

determining whether the media is in use with the node computer system;

sending a response message over the network with the node computer system if the media is not in use; and discarding the information request message without sending a response message over the network and without further attempting to send the response message, if the media is in use.

19. The method of claim 18, wherein the method further comprises the steps of:

receiving and processing the information request message with the node computer system; and preparing a response message to the information request message with the node computer system.

20. The method of claim 19, wherein the step of preparing a response message comprises the steps of:

preparing the data and information request into a packet;

transferring the packet from a CPU to a transmitter/receiver of the first node computer system; and sending the packet over the media using the transmitter/receiver of the first node computer system.

21. A computer implemented method for responding to an information request message on a communications network for a plurality of node computer systems, the node computer systems being coupled by a media, the method comprising the steps of:

receiving an information request message at the plurality of node computer systems coupled to the network;

preparing a response message to the information request message at each of the plurality of node computer systems;

determining whether the media is in use with each of the plurality of node computer systems;

sending the response message over the network with each the plurality of node computer systems that determines the media is not in use; and discarding the response message from the node computer system without sending the response messages and without further attempting to send the response message, for each of the plurality of node computer systems that determines the media is in use.

22. The method of claim 18, further comprising the steps of:

determining whether the response message is to be sent persistently;

before the disregarding step, repeating the steps of monitoring, determining and sending until the response message is sent over the network at least once, if the message is to be sent persistently.

23. A means for responding to an information request message on a network comprising a first node and a second node coupled by a media, the means comprising:

a means for receiving the information request message at the second node;

a means for preparing a response message to the information request message with the second node;

a means for determining whether the media is in use with the second node;

a means for sending the response message by the second node if the media is not in use; and a means for discarding the response message from the second node computer system without sending the response message and without further attempting to send the response message, if the media is in use.

24. The means of claim 23, further comprising:

a means for monitoring the availability of the media by the first node;

a means for sending the information request message from the first node when the media is available.

25. The means of claim 23, further comprising:

a means for receiving the information request message at a third node coupled to the first node and second node by the media;

a means for preparing the response message to the information request message with the third node;

a means for determining whether the media is in use with the third node computer system;

a means for sending the response message with the third node if the media is not in use; and a means for discarding the response message from the third node without sending the response message and without further attempting to sound the response message, if the media is in use.

26. The means of claim 23, further comprising:

a means for receiving the information request message at a plurality of other nodes, each of the other nodes coupled to the first node and the second node by the media;

a means for preparing a response message to the information request message at each of the other nodes;

a means for determining whether the media is in use with each of the other nodes;

a means for sending the response message by each other nodes that determine that the media is not in use; and a means for discarding the response message, without sending the response message and without further attempting to send the response message, by each of the other nodes that determine that the media is in use.

* * * * *

UNITED STATES PATENT AND TRADEMARK OFFICE
CERTIFICATE OF CORRECTION

PATENT NO. : 5,604,869
DATED : February 18, 1997
INVENTOR(S) : Mincher, et al.

It is certified that error appears in the above-identified patent and that said Letters Patent is hereby corrected as shown below:

In the Claims:

Claim 21, column 15, line 67, "system" should read --systems--
Claim 21, column 15, line 67, "messages" should read --message--
Claim 25, column 16, line 48, "sound" should read --send--

Signed and Sealed this

Third Day of August, 1999

Attest:

Q. TODD DICKINSON

*Attesting Officer*       *Acting Commissioner of Patents and Trademarks*